July 11, 1961    H. G. BRILMYER    2,991,681
TUBULAR RIVET HAVING FRANGIBLE TOOL GRIPPING PORTION
Filed May 22, 1958
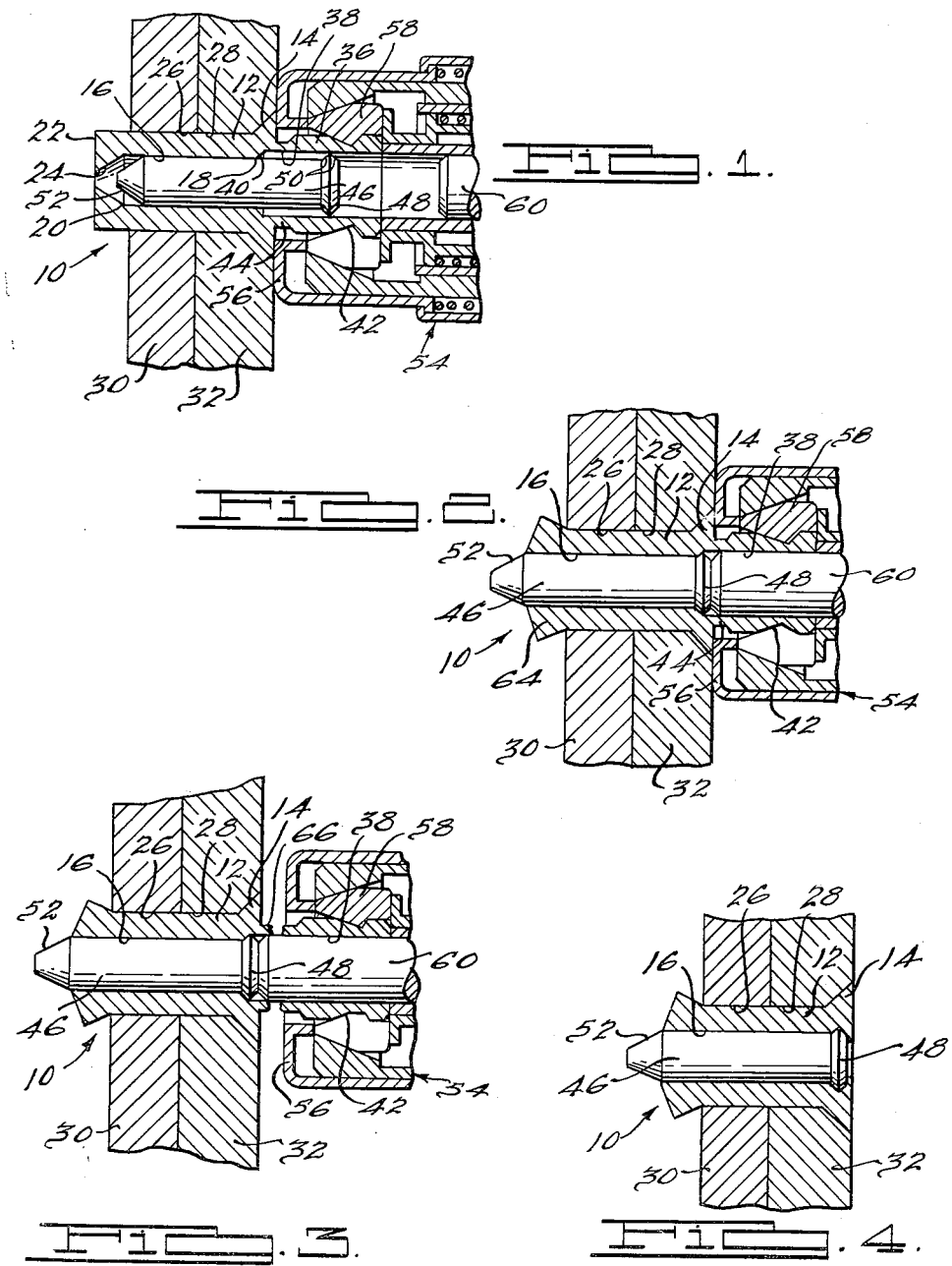
INVENTOR.
*Harold G. Brilmyer*
BY
*Harness, Dickey & Pierce*
ATTORNEYS.

United States Patent Office 2,991,681
Patented July 11, 1961

2,991,681
TUBULAR RIVET HAVING FRANGIBLE TOOL GRIPPING PORTION

Harold G. Brilmyer, Grosse Pointe, Mich., assignor to Huck Manufacturing Company, Detroit, Mich., a corporation of Michigan
Filed May 22, 1958, Ser. No. 737,139
1 Claim. (Cl. 85—40)

This invention relates generally to blind fasteners and more particularly to a drive pin assembly which can be applied with power operated fastener applying tools.

The principal object of this invention, therefore, is to provide an improved drive pin assembly which is adapted to be driven with power operated fastener applying tools.

Another object of this invention is to provide a drive pin assembly which is simple in construction, economical to manufacture, and which is readily applied from only one side of the work.

Further objects, features and advantages of this invention will become aparent from a consideration of the following description, the appended claim and the accompanying drawing in which:

FIGURE 1 is a sectional view of a pair of plates to be connected, showing the drive pin assembly of this invention assembled with the plates and a nose assembly on a power operated driving tool applied to the drive pin assembly for driving it into a position connecting the plates;

FIG. 2 is a sectional view illustrated similarly to FIG. 1 showing the assembly in a partially driven position;

FIG. 3 is a sectional view, illustrated similarly to FIGS. 1 and 2, showing the removable tail broken away from the collar; and FIG. 4 is a sectional view showing the drive pin assembly in a final position connecting the plates.

With reference to the drawing, the fastener of this invention, indicated generally at 10, is illustrated in FIG. 1 as including a tubular collar 12 having an enlarged flat head 14 at one end. The interior surface 16 of the collar 12 is cylindrical from a point 18 adjacent the head 14 to a point 20 adjacent the opposite end 22 of the collar 12. The inner surface of the collar 12 has a tapered portion 24 located between the point 20 and the collar end 22. The collar 12 is of a length such that when it is positioned in aligned openings 26 and 28 in a pair of plates 30 and 32 to be connected, as illustrated in FIG. 1, so that the outer surface of the head 14 is flush with the outer side of one plate, the end portion of the collar having the tapered inner surface 24 is located on the opposite side of the other plate.

A tubular tail extension 36 for the collar 12 is formed integral with the collar at the head end thereof. The tail 36 has a cylindrical inner surface 38 which is of a diameter slightly greater than the diameter of the collar inner surface 16. The juncture of the cylindrical surfaces 16 and 38 is located a short distance inwardly of the head end of the collar and is tapered to form a seat 40.

The tail 36 is formed on its exterior surface with a V-shape pull groove 42 located intermediate the ends of the tail 36. At the juncture of the tail 36 and the head 14, the tail is provided with a reduced thickness portion 44 which constitutes a breakneck for a purpose to appear presently.

A drive pin 46, which is generally cylindrical in shape and is of a diameter substantially equal to the diameter of the inner cylindrical surface 16 of the collar 12, extends into the collar. The pin 46 has an enlarged head 48 at one end which is formed on opposite sides with tapered surfaces 50. The opposite end 52 of the pin 46 is tapered so that it is of a progressively decreasing diameter.

In the use of the fastener 10 to connect the plates 30 and 32, the fastener is initially assembled with the plates from the accessible side of the work as shown in FIG. 1. A fastener applying tool (not shown) having a nose assembly such as the one indicated generally at 54, is applied to the tail 36 as shown in FIG. 1. The nose assembly 54 includes an anvil 56, which engages the head 14 and maintains it in a position flush with the outer side of the plate 32, jaws 58 which engage the tail 36 at the pull groove 42 and a drive plunger 60 which is engageable with the pin head 48 for driving the pin 46 inwardly of the collar 12.

The details of the nose assembly 54, which form no part of the present invention and are, therefore, not disclosed in detail herein, constitute the subject matter of application Serial No. 741,651 filed June 12, 1958, owned by the assignee of this invention. On operation of the tool having the nose assembly 54, the jaws 58 exert a pulling force on the tail 36 and the drive plunger 60 exerts an opposite force on the pin 46. On initial operation of the tool, the plunger 60 drives the pin 46 into the collar 12 to a stop position in which the tapered underside of the pin head 48 engages the collar seat 40. During such movement, the tapered end 52 of the pin 46 progressively engages the tapered collar surface 24 and acts to spread the end portion of the collar 12 outwardly to the position shown in FIG. 2. In this position, the end portion of the collar is expanded radially outwardly so that it forms a head 64 on the blind side of the work larger than the opening 26 in the plate 30 to prevent withdrawal of the collar 12 from the plates 30 and 32. The breakneck 44 is formed of a predetermined thickness such that it is of a strength such that it will withstand a pulling force which exceeds the force necessary to drive the pin 46 to the position illustrated in FIG. 2.

Continued operation of the nose assembly 54 to exert a pulling force on the tail 36 operates to fracture the breakneck 44 as shown in FIG. 3. The resulting annular flange 66 which projects outwardly from the head 14, as shown in FIG. 3, when the breakneck 44 is fractured, is then collapsed inwardly to a position engaging the outer tapered surface 50 of the pin head 48 as shown in FIG. 4. This is readily accomplished by tapping the flange 66 with a hammer or the like. When the flange 66 is collapsed, it constitutes a stop for positively preventing accidental withdrawal of the pin 46 and, in addition, provides the accessible side of the plate 32 with a substantially flat surface.

From the above description, it is seen that this invention provides a drive pin and collar assembly 10 which is readily operable from one side of the work to connect the plates 30 and 32. Because of the fact that the assembly 10 is formed so that it is operable with power equipment, the necessary forces for driving the pin 46 are readily applied to the assembly 10.

Although the invention has been described with respect to a preferred embodiment thereof, it is to be understood that it is not to be so limited, since changes can be made therein which are within the scope of the invention as defined by the appended claim.

What is claimed is:

A blind fastener adapted to be arranged in work having an accessible side and another side and adapted to be driven by an axial force, said fastener comprising a tubular collar having a radially outwardly extending head at one end thereof adapted to engage the accessible side of the work and being of a length sufficient to pass through the work so that an opposite end portion thereof is disposed on the other side of the work, said collar having a substantially cylindrical exterior surface between said head and the opposite end thereof, said collar having a substantially cylindrical interior surface portion terminating within said opposite end in a tapered portion having a diameter increasing inwardly of said collar and terminating in said one end in an enlarged diameter seat, a tubular tail formed integral with said collar and extending axially thereof at said one end and having an inner diameter at least as large as the diameter of said seat, and a pin of a diameter substantially equal to the diameter of said interior surface portion of said collar disposed in said collar and having a tapered end located adjacent said tapered portion in said opposite end of said collar, said pin being movable axially within said interior surface portion of said collar in response to an axial force applied between said pin and said tail and having a head at the opposite end thereof engageable with said seat for limiting movement of said pin axially of said collar to a position in which said tapered end of said pin is positioned in said tapered portion in said opposite end for expanding said opposite end of said collar radially outwardly to form a blind head on said collar, said tail having a reduced wall section portion disposed axially outwardly from said seat and adjacent said head whereby upon engagement of said head of said pin with said seat in said collar an increase in the axial force applied between said pin and said tail will cause said tail to separate from said collar at said reduced wall section portion.

References Cited in the file of this patent

UNITED STATES PATENTS

| | | |
|---|---|---|
| 547,988 | Bull | Oct. 15, 1895 |
| 2,282,711 | Eklund | May 12, 1942 |
| 2,326,855 | Hathorn | Aug. 17, 1943 |
| 2,389,479 | Austin | Nov. 20, 1945 |
| 2,751,809 | Barker | June 26, 1959 |